Patented Mar. 25, 1924.

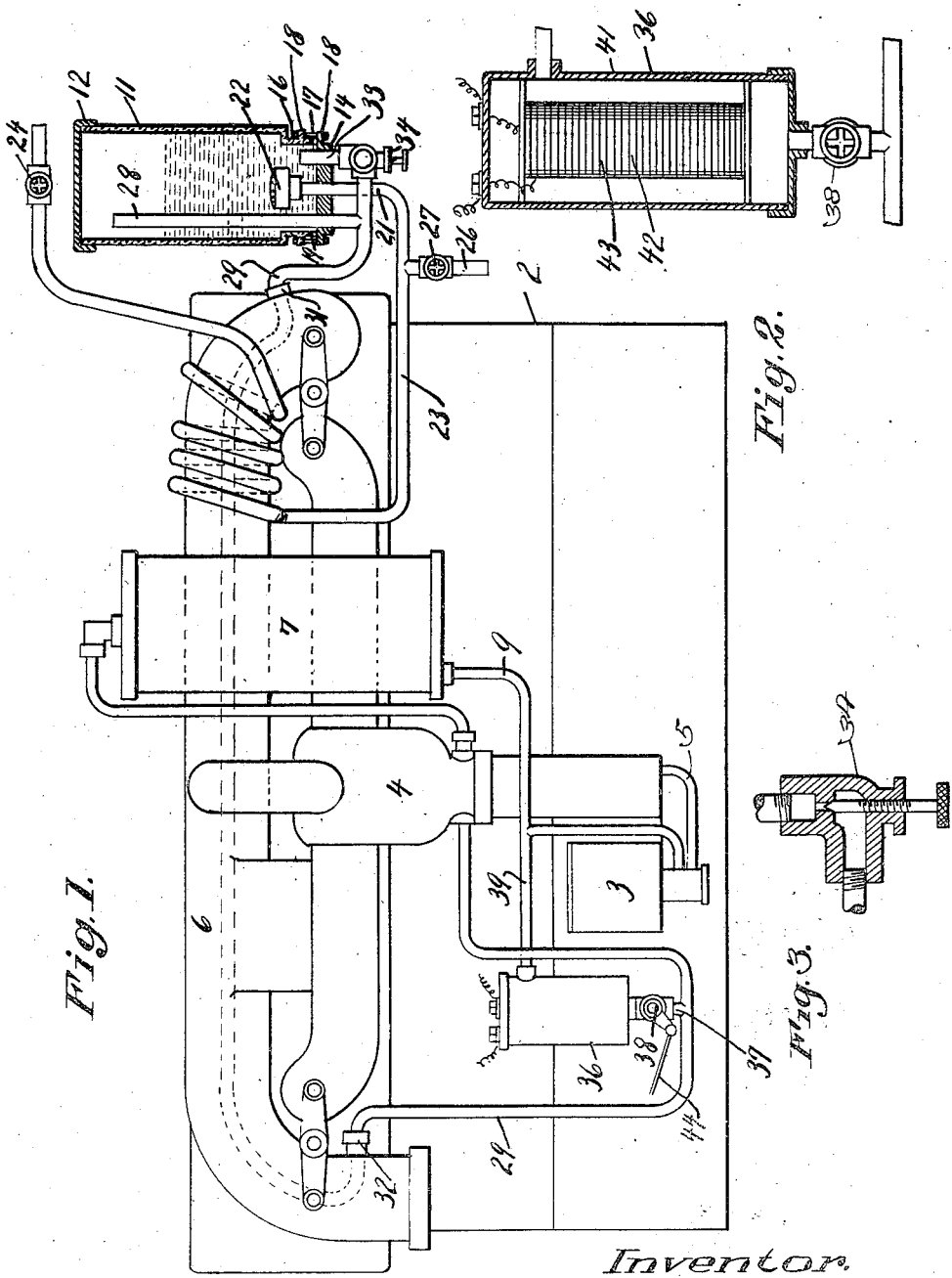

1,488,054

UNITED STATES PATENT OFFICE.

CHESTER J. MUZZY, OF BAKER, OREGON.

FUEL VAPORIZER FOR INTERNAL-COMBUSTION ENGINES.

Application filed March 29, 1921. Serial No. 456,619.

*To all whom it may concern:*

Be it known that I, CHESTER J. MUZZY, a citizen of the United States, and resident of Baker, county of Baker, and State of Oregon, have invented a new and useful Fuel Vaporizer for Internal-Combustion Engines, of which the following is a specification.

The present invention relates to improvements in fuel vaporizers for internal combustion engines and its object is to provide a practical means for injecting superheated air and steam into the inlet manifold, to there be mixed with the gas mixture from the carburetor to purify the same and to insure a more complete combustion of the whole charge in the combustion chambers. A further object is to provide the means for heating said air and said steam by utilizing the heat of the exhausted gases which ordinarily goes to waste. Another object is to provide an auxiliary system by means of which the gas may be heated before the engine has been started and before the exhaust manifold is ready to furnish heat for this purpose. A further object of my invention is to provide a means by which the air, before being heated in the exhaust manifold, is purified by being drawn through a water bath. Other objects and advantages of my invention will appear hereinafter.

In the following specification I am going to illustrate my fuel vaporizer in connection with a vacuum tank interposed between the carburetor and the intake manifold, but I wish to state that I use this vacuum tank only for one particular feature of my invention and do not wish to be restricted with reference to all the other features of my invention to such motors as are equipped with said vacuum tanks.

I attain the objects of my invention by means of the mechanism illustrated in the accompanying drawing, in which Figure (1) represents a diagrammatical side view of an automobile engine having my fuel vaporizer attached thereto, Figure (2) a sectional detail view of an electric heater used in my fuel vaporizer, and Figure 3, a detail view of a needle valve used in my device.

In Figure (1) the engine (2) is shown provided with the carburetor (3), the intake manifold (4), the exhaust manifold (6) and the vacuum tank (7) supplying gasoline to the carburetor through pipe (9). In addition the drawing shows in front of the engine the glass jar (11) turned upside down so that the closed bottom (12) is on top while the metal cap (14) is at the lower end and secured to the neck (16) of the jar by means of bolts (17) penetrating corresponding lugs (18) projecting from neck and cap, a rubber gasket (19) making the connection water tight.

Into this cap are brazed, so as to make a perfectly water-tight connection with the same, three copper tubes. The central one, (21), extends upward from the cap only a small distance and carries on top a perforated nozzle (22). Its lower end connects with a tube (23) which is carried rearwardly and upwardly until it reaches the exhaust manifold, then wound around the manifold a number of times, carried upward to a point higher than any possible water level in the glass jar and forward again to any convenient place from which fresh air may be drawn into the same. A valve (24) is provided at its end by means of which it may be closed. It will be readily seen that a partial vaccum caused in the glass jar will draw in air through this tube and that this air will be heated in passing around the exhaust manifold, in case the latter is heated.

From the tube (23) extends downwardly, right near the cap (14), a tube (26) provided with a valve (27). When the valve (24) at the other end of the tube is closed and the lower end of tube (26) immersed in a dish with water, a partial vacuum created in the jar will cause water to rise into the same through the open valve (27). When the valve (27) is closed and valve (24) opened, the water, not having any exit, will remain in the glass tube after having found its equilibrium in the tube (23). In actual use the glass jar should be kept filled to the level indicated in the drawing.

The partial vacuum referred to hereinbefore is created by the suction of the intake strokes of the different cylinders. This is brought about by means of a second tube (28) extending into the glass jar (11) through the cap (14). The latter tube extends to a height above the normal water level and connects at its bottom with the tube (29), which is carried rearwardly through the exhaust manifold, two stuffing boxes (31) and (32) securing a tight fit around the tube at its entrance into and exit from the exhaust manifold, thence downwardly to form a U and from the other end of the U into the intake manifold. The tube (29) is also connected with the third tube (33) extending into the glass jar (11). The latter tube does not reach the normal water level, but extends only a small distance above the cap of the glass jar, just sufficient to keep any dirt that may accumulate on the surface of the cap from entering the tube. It is controlled by the needle valve (34) shown in detail in Figure 3 so that the water supply fed through this tube may be reduced to any quantity desired.

It will thus be seen that the whole system described so far is controlled from the intake manifold and that the vacuum created within the same draws successively on the tubes (29), (28), the inside space of the glass jar (11), the water in the glass jar, the nozzle (22) and the tube (23), and that during this process it causes air to enter the tube (23) through the valve (24) to be heated while being carried around the exhaust manifold, to reach the nozzle (22) in such heated condition and to rise through the water, thereby purifying itself and at the same time heating the water to some extent, sufficiently at least to keep it from freezing in cold weather; that it further draws on the purified air within the glass jar (11) through tube (28), causes the same to enter the tube (29), to become saturated with the water admitted to pipe (29) through the needle valve (34), to pass through the exhaust manifold to be converted into steam and then finally to enter the intake manifold to mix with the gas, to heat and purify the same and cause a complete combustion of the mixture admitted to the combustion chamber without leaving any non-combustible impurities and deposits, which is an essential advantage especially under present conditions where cheap grades of gasoline have to be used frequently.

With reference to the jar (11) I wish to point out that besides purifying the air to be fed into the intake manifold it is a means for regulating the amount of heated air and steam to be admitted. In drawing on the air space the suction has to overcome the resistance of the water, because it is clear that no fresh air can enter the air space before the water has been raised sufficiently high to clear the lowest part of the tube (23). At what time this condition arrives depends upon the elevation of the jar with reference to the tube and the exhaust manifold and upon the amount of water supplied to the jar. From these facts it may be seen that the supply of heated air and steam to the intake manifold is capable of the finest adjustment, since it may be regulated first by the manufacturer in selecting the proper location for the jar, and secondly by the operator of the machine in controlling the water supply.

Into this system I introduce my electric heating device for priming purposes. It will be noted that the device so far described depends for heat altogether on the exhaust manifold, which, of course, cannot furnish any heat when the machine has been standing idle for some length of time. To supply heat when first starting the machine, I provide my electric heater (36), which is shown in the drawing as being provided above the tube (29) in the U formed by the same after leaving the exhaust manifold. It is connected to the tube (29) through the tube (37), emanating from its bottom, which latter is controlled by a valve (38) and receives gasoline from the vacuum tank through the tube (39) connecting with the pipe (9). The heater may be of any type and is here shown as comprising a cylindrical casing (41) within which is mounted a porcelain insulator (42) on which the conductor (43) is wound. The conductors are led to a switch which may be arranged at any convenient place on the automobile. The valve (38) is controlled by a connecting rod (44) which latter again may be led to any place from which it is desired to control the valve.

Normally the valve (38) is closed and the switch controlling the heater turned off. Since the heater is placed below the vacuum tank it is kept filled with gasoline through the pipes (39) and (9). Before starting the motor, the switch is turned on to heat the gasoline, which can be brought to the boiling point in less than a minute's time. Then the valve (38) is opened, the gasoline runs downward into the pipe (29) and the cranking of the motor by hand or by a self-starter draws the heated gasoline into the intake manifold and into the different combustion chambers. After the motor is started, the valve (38) is closed again and the exhaust manifold is relied on for supplying heat to the intake manifold.

I claim:

In means for supplying heated air and steam to the intake manifold of an internal combustion engine, a system controlled by the intake suction of the engine comprising an inverted jar having a cap secured thereon and being partly filled with water so as to leave an enclosed air space above the water, a tube fixed in the cap leading into the air space and connecting the same with the intake manifold, a second tube supported in the cap connecting the water with the first tube, a needle valve for controlling the port area of the second tube and a third tube supported in the cap adapted to supply heated air to the jar under the influence of the intake suction of the engine.

CHESTER J. MUZZY.